United States Patent [19]
Zimmerlin

[11] Patent Number: 5,582,133
[45] Date of Patent: Dec. 10, 1996

[54] CAT LITTER PAN ENCLOSURE

[76] Inventor: Karen M. Zimmerlin, 6001 Rosalie Ct., Metairie, La. 70003

[21] Appl. No.: 343,704

[22] Filed: Nov. 21, 1994

[51] Int. Cl.$^6$ ........................................... A01K 29/00
[52] U.S. Cl. .................................................. 119/165
[58] Field of Search .............................. 119/165, 166, 119/167, 168, 169, 170, 15

[56] References Cited

U.S. PATENT DOCUMENTS

| | | | |
|---|---|---|---|
| 3,085,550 | 4/1963 | Crawford | 119/1 |
| 4,548,160 | 10/1985 | Feitelson | 119/1 |
| 4,627,381 | 12/1986 | Reed et al. | 119/165 |
| 4,627,382 | 12/1986 | Muzzey | 119/165 |
| 4,766,845 | 8/1988 | Bavas | 119/1 |
| 4,779,566 | 10/1988 | Morris et al. | 119/165 |
| 4,838,202 | 6/1989 | Neu | 119/165 |
| 5,012,765 | 5/1991 | Naso et al. | 119/166 |
| 5,092,277 | 3/1992 | Baklie et al. | 119/165 |
| 5,140,948 | 8/1992 | Roberts | 119/165 |

*Primary Examiner*—Thomas Price
*Attorney, Agent, or Firm*—Joseph N. Breaux

[57] ABSTRACT

A cat litter pan enclosure comprising a first litter pan member, and a litter pan receiving member into which the first litter pan member is installed. The first litter pan member has a first pan center and a first pan perimeter. The litter pan receiving member has a bottom member and four side members. The bottom member has a first and second bottom surface. The four side members extend from the first bottom surface and are in connection with one another to form a closed bottomed container that is open above the first bottom surface. The first bottom surface is of dimensions sufficient to allow the pan center of the litter pan member to be placed thereon in a manner such that any portion of the pan perimeter adjacent a side member is between two and five inches from the side member. One of the side members has a height of between four and eight inches above the first bottom surface. The other three side members have a height of between eight and thirty-six inches above the first bottom surface. The first bottom surface may include a positioning structure for facilitating positioning of the first pan center in registration with a central portion of the first bottom surface. The positioning structure contacts the litter pan or encloses a portion of the exterior of the litter pan to prevent the litter pan from sliding about the first bottom surface.

2 Claims, 3 Drawing Sheets

CAT LITTER PAN ENCLOSURE

TECHNICAL FIELD

The present invention relates to devices for confining cat urine within a predetermined area and more particularly to devices for confining cat urine within a predetermined area that include at least two urine containment areas.

BACKGROUND ART

Keeping cats within an apartment or house can be a great joy for many individuals. However, confining these animals indoors raises the problem of dealing with their feces and urine. Cats will generally defecate within a litter box but will then scratch the litter in the box discharging litter from the box in the general area of the box. When urinating, cats will stand within the box near the edge of the litter box and urinate onto the walls and carpets surrounding the box. These practices can lead to unsightly stains and unsanitary, foul smelling conditions in the house or apartment when not promptly cleaned up. It would be a benefit, therefore, to have a device which would prevent the cats from urinating on the building walls and carpets. It would be a further benefit if the device was lightweight and easy to clean.

The following patents are illustrative of prior attempts to alleviate these problems.

| U.S. Pat. No. | Inventor |
| --- | --- |
| 5,140,948 | Roberts |
| 5,092,277 | Baillie et al. |
| 5,012,765 | Naso et al. |
| 4,766,845 | Bavas |
| 4,648,160 | Feitelson |
| 3,085,550 | Crawford |

Roberts, issued Aug. 25, 1992, discloses an enclosure defining a litter box. The enclosure includes a base portion, and a removable upper portion mounted to the base portion. A door to the upper portion includes a signal generating switch to effect actuation of a blower motor positioned coaxially within an exhaust conduit directed through the upper portion.

Baillie et al., issued Mar. 3, 1992, discloses an enclosed housing having a cat liter box within its bottom confines. An opening is provided in the top surface of the housing through which the cat climbs onto a lower, intermediate surface level. A partition is provided around which the cat is forced to walk in order to gain entry to the litter box by climbing down through a second opening. The lower, intermediate surface level is an open-grid construction, so that when the cat reverses its path to leave the litter box, any litter trapped on its paws falls, by gravity, back into the box as the cat walks around the partition.

Naso et al., issued May 7, 1991, discloses a waste collection and screening device having two litter pans in opposed orientation, an opened face of a first litter pan in facing arrangement with an open face of the second litter pan with a screen member interposed between the opposing litter pans.

Bavas, issued Aug. 30, 1988, discloses a cat litter pan system consisting of a permanent extruded plastic litter receptacle suitable for receiving therein a disposable litter tray and a two component cover section that matingly engages the plastic receptacle wherein the disposable litter tray is positioned adjacently to the cover section and is easily removed, disposed of, and replaced with a new one.

Feitelson, issued Oct. 22, 1985, discloses a disposable cat litter box including a horizontally extending bottom, preferably rectangular, and attached along the ends to upwardly extending end walls and side walls which may be further folded to provide a top cover of one-half the area of the horizontally extending bottom.

Crawford, issued Apr. 16, 1963, discloses a cat sanitary container and enclosure including a housing having a closed top; a closed bottom; sidewalls connecting the top and bottom, one upright side of the housing is open; a lip, carried by and projecting inward from the wall opposite the open side and spaced from the bottom; and a tray receivable in the bottom of the housing having an upstanding side with its upper portion engageable between the lip and the wall opposite the open side.

None of these attempts have satisfactorily solved the problems described above.

GENERAL SUMMARY DISCUSSION OF INVENTION

It is, thus, an object of the invention to provide a cat litter pan enclosure that prevents cats from spraying urine on building walls and carpets.

It is a further object of the invention to provide a cat litter pan enclosure that cats will utilize.

It is a still further object of the invention to provide a cat litter pan enclosure that is easy to clean.

It is a still further object of the invention to provide a cat litter pan enclosure that is lightweight.

Accordingly, a cat litter pan enclosure is provided. The cat litter pan enclosure comprises: a first litter pan member, and a litter pan receiving member into which the first litter pan member is installed.

The first litter pan member is preferably a conventional litter pan having a first pan center and a first pan perimeter. Cat litter is placed within the litter pan member in the conventional manner.

The litter pan receiving member has a bottom member and four side members. The bottom member has a first and second bottom surface. The four side members extend upwardly from the first bottom surface and are in connection with one another to form a closed bottomed container that is open above the first bottom surface.

The first bottom surface is of dimensions sufficient to allow the pan center of the litter pan member to be placed thereon in a manner such that any portion of the pan perimeter is between two and five inches from the nearest side member. One of the side members has a height of between four and eight inches above the first bottom surface. The other three side members have a height of between eight and thirty-six inches above the first bottom surface.

The litter pan receiving member provides an enclosure for the litter pan member which catches and holds any cat urine which does not enter the litter pan member. Because the perimeter of the litter pan member is between two and five inches from the nearest sidewall, a cat entering the enclosure must cross the channel formed between the side members and the perimeter of the litter pan member in order to use the litter box positioned substantially in the center of the bottom member of the enclosure. The width of the channel is too narrow for a cat to comfortably use the channel as a primary defecating or urinating area. The cat is thus forced to utilize the litter pan member for this purpose. Because the side members are at least four inches high, the side members confine the stray urine and cat litter within the enclosure where they can be conveniently removed.

The litter pan receiving member is preferably constructed of a non-porous, light weight material, such as plastic, to make cleaning the receiving member easier. In addition, the litter pan receiving member preferably includes at least one, and more preferably two, handles to aid in lifting and cleaning. The litter pan receiving member may also include pads on the second bottom surface to prevent scratches on the surface upon which the litter pan receiving member is placed. In a preferred embodiment, the bottom and side members are integrally formed.

In another preferred embodiment, a second litter pan member having a second pan center and a second pan perimeter is included; and the first bottom surface is of dimensions sufficient to allow the first and second pan centers of the first and second litter pan members to be simultaneously placed thereon in a manner such that the portions of the first and second pan perimeters not adjacent one another are between two and five inches from the nearest side member.

In another preferred embodiment, the first bottom surface of the bottom member includes a positioning structure on the surface thereof for facilitating positioning of the first pan center in registration with a central portion of the first bottom surface. The positioning structure contacts the litter pan or encloses a portion of the exterior of the litter pan to prevent the litter pan from sliding about the first bottom surface of the litter pan receiving member.

In a preferred embodiment, the positioning structure includes two, or more, registration members, extending upwardly from the first bottom surface, that are spaced a distance sufficient to at least partially receive therebetween the bottom of the litter pan.

In another preferred embodiment, the positioning structure includes a recess, in the first bottom surface, having a perimeter surrounding an area of a size sufficient to at least partially receive thereon the pan bottom.

In another preferred embodiment, the first bottom surface includes a continuous registration member extending therefrom and surrounding an area thereof of a size sufficient to receive thereon at least a portion of the litter pan bottom.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

As discussed herein before, the cat litter pan enclosure of the present invention, generally referenced by the numeral 10, comprises: a litter pan member, and a litter pan receiving member into which the litter pan member is installed.

Figure 1:
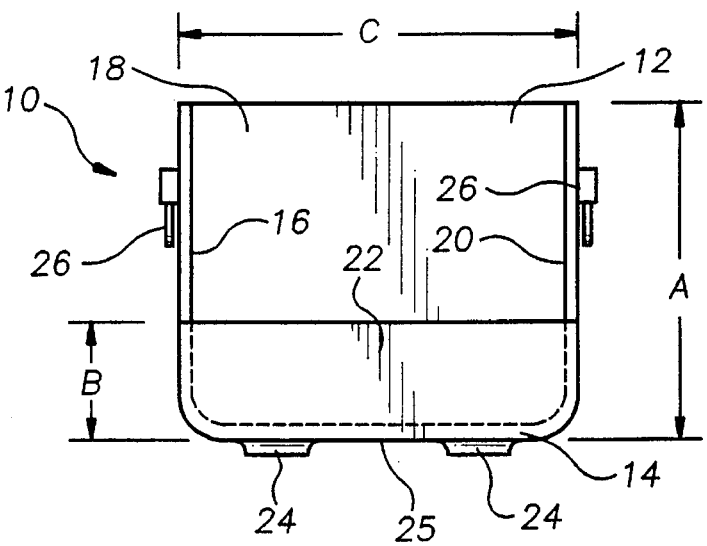
FIG. 1 is a frontal view of an exemplary embodiment of the litter pan receiving member of the present invention.

FIG. 1 is a frontal view of an exemplary embodiment of a litter pan receiving member 12. Receiving member 12 includes a bottom member 14, four side members 16,18,20 22, four pads 24 (two shown), and two handles 26.

Receiving member 12 is essentially an open topped container having side members 16,18,20 on three sides which rise 24 inches from bottom member 14 and one side member 22 which rises 6 inches from bottom member 14. Rubber pads 24 are positioned at the corners of a second bottom surface 25 of bottom member 14. One of the handles 26 is located on side member 16, the other handle 26 is located on side member 20. Receiving member 12 also includes a positioning structure (not shown) for positioning the litter pan member within receiving member 12.

Figure 2:
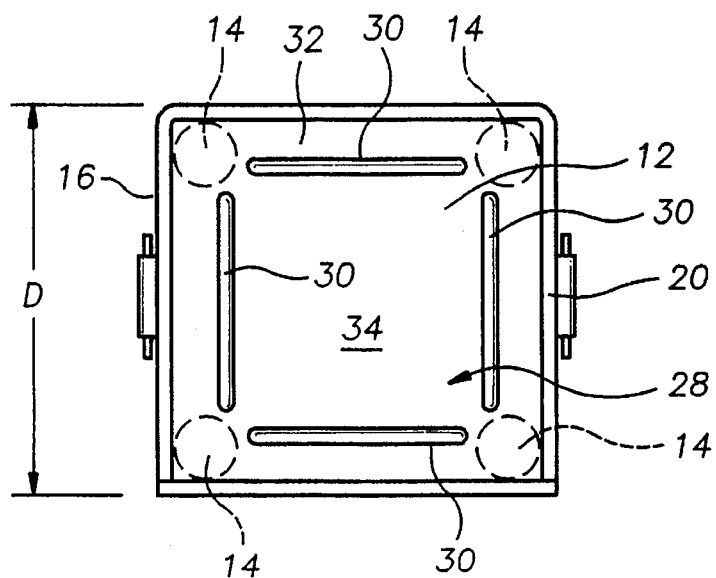
FIG. 2 is a top view of the exemplary embodiment shown in FIG. 1.

Bottom member 14 and the four side members 18,18,20, 22 are integrally formed from one-quarter inch (¼") thick plastic. Three of the side members 16,18,20 rise upward from bottom member 14 a distance "A" of about twenty-four inches (24"). Side member 22 rises upward from bottom member 14 a distance "B" of about six inches (6"). Side members 18,22 each measure about thirty-two inches (32") in width "C". As shown in FIG. 2, side members 16, 20 also have a width "D" of about thirty-two inches (32").

FIG. 2 is a top view of receiving member 12 showing a preferred positioning structure, generally referenced by the numeral 28, having four registration members 30. Registration members 30 are about fourteen inches (14") long and rise from a first bottom surface 32 about one-half inch (½"). The four registration members 30 define a portion 34 of first bottom surface 32 upon which a litter pan member may be positioned and retained. Also shown in FIG. 2 is the positioning of the four rubber pads 14.

Figure 3:
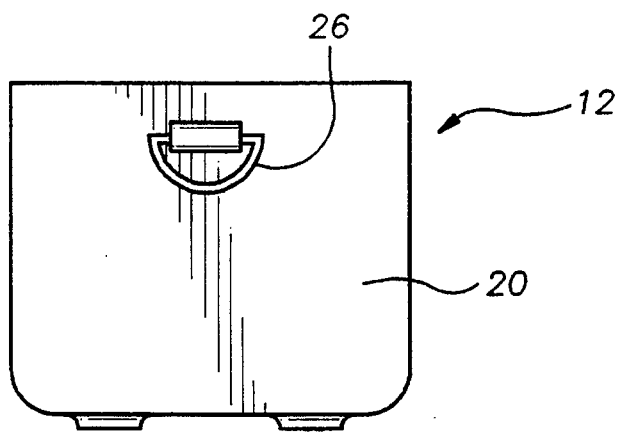
FIG. 3 is a side view of the exemplary embodiment shown in FIG. 1.

FIG. 3 is a side view of receiving member 12 showing side member 20 and the positioning of handle 26 thereon.

Figure 4:
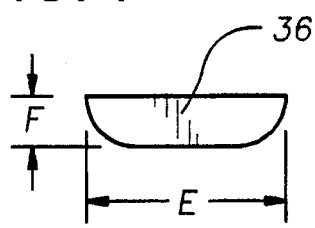
FIG. 4 is a side view of an exemplary embodiment of the litter pan member of the present invention.
Figure 5:
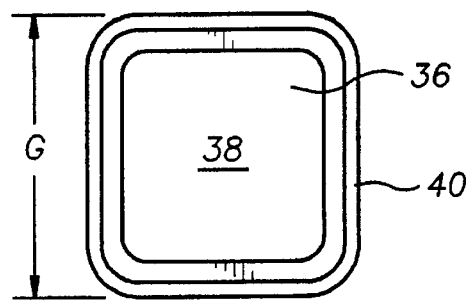
FIG. 5 is a top view of the litter pan member shown in FIG. 4.

A side view of a litter pan member 36 is shown in FIG. 4. Litter pan member 36 is constructed of one-eighth inch (⅛") thick plastic and has a width "E" of about twenty-six inches (26") and a height "F" of about three inches (3"). As shown in FIG. 5, litter pan member 36 has a length "G" of about twenty-six inches (26"). Also shown is a litter containment cavity 38 surrounded by a lip 40.

Figure 6:
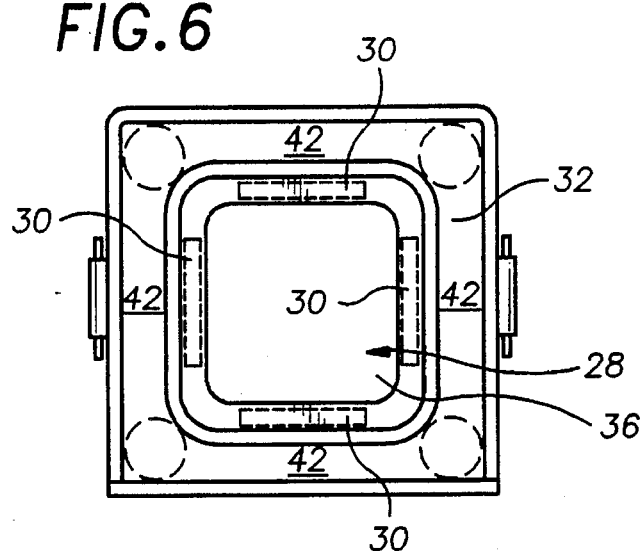
FIG. 6 is a top view of the litter pan member of FIG. 4 in position within the litter pan receiving member of FIG. 1.
Figure 7:
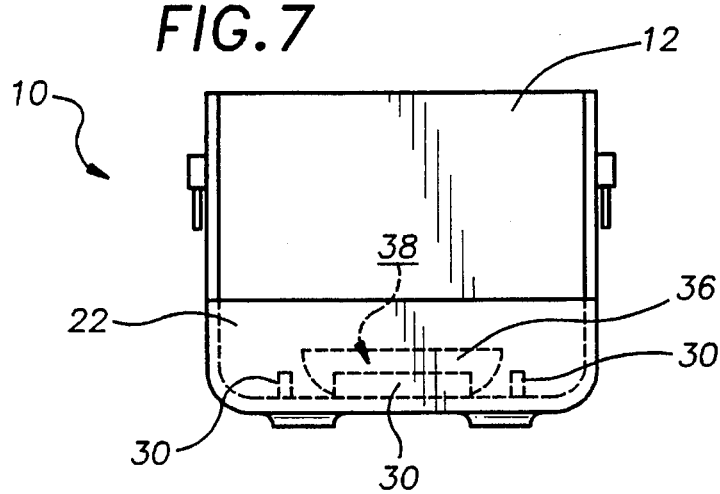
FIG. 7 is a side view showing the litter pan member of FIG. 4 in position within the litter pan receiving member of FIG. 1.

In FIG. 6, litter pan member 36 is shown positioned on first bottom surface 32, between the four registration members 30 of positioning structure 28. A channel 42 is formed entirely around litter pan member 36. Channel 42 is defined by side members 16,18,20,22; first bottom surface 32; and lip 40 of litter pan member 36. In this exemplary embodiment, channel 42 is about three inches (3") wide and about three inches (3") deep. FIG. 7 is a frontal view of receiving member 12 with litter pan member 36 in position.

Figure 10:
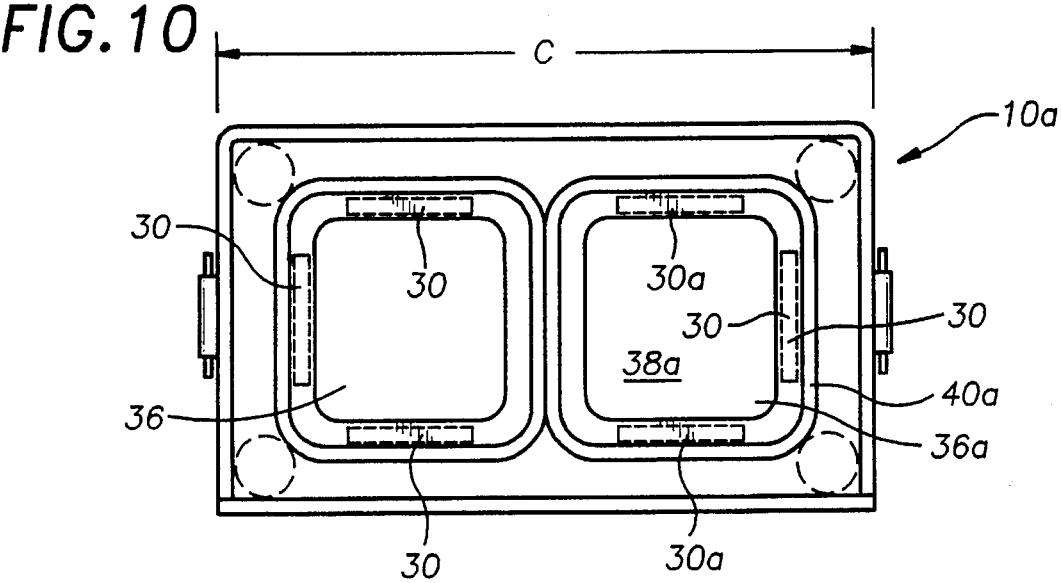
FIG. 10 is a top view of a second exemplary embodiment of the litter pan enclosure including a second litter pan member.

A second exemplary embodiment of a litter pan enclosure, generally referenced by the designation 10a, is shown in FIG. 10. Litter pan enclosure 10 includes a receiving member 12a, first litter pan member 36, and a second litter pan member 36a. Receiving member 12a is identical in all respects to receiving member 12, as previously described, except width "C" is about fifty-eight (58") inches and two additional registration members 30a are included in receiving member 12a. The additional width and registration members 30a are included to allow receiving member 12a to accommodate second litter pan member 36a. Second litter pan member 36a, shown adjacent litter pan member 36 in the figure, is identical to litter pan member 36 previously described including a second pan center 38a and a second pan perimeter 40a.

Use of litter pan enclosure 10 is now described with reference to FIGS. 6 and 7. Use of cat litter pan enclosure 10 is simple. Litter pan member 36 is positioned onto first bottom surface 32 between the four registration members 30; and litter containment cavity 38 filled with cat litter. In order to reach litter containment cavity 38, cats scale side member 22 and traverse channel 42. Because channel 42 is only three inches wide, cats find using the channel for urinating and defecating too confining and prefer to use litter containment cavity 38. Side member 22 rises about three inches higher than lip 40 of litter pan member 36. This allows side member 22 to protect surrounding building walls and carpets from misdirected urine streams and cat litter scratched from litter containment cavity 36 following defecation.

Cleaning the litter pan enclosure 10 is equally simple. Because litter pan enclosure 10 is constructed from non-porous plastic, it is light weight and easily emptied and then rinsed with a hose whenever the cat litter is changed.

Figure 8:
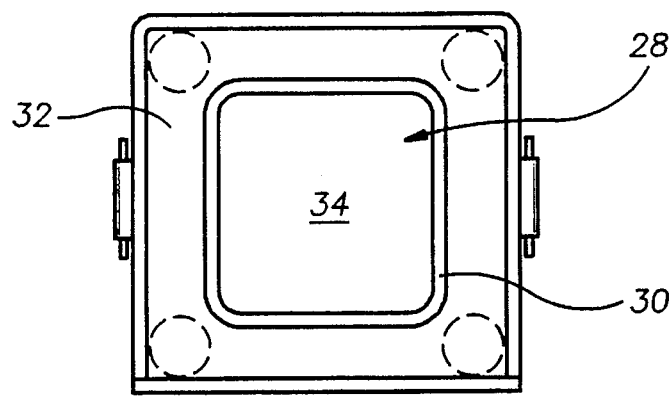
FIG. 8 is a another exemplary embodiment of the litter pan receiving member with a preferred positioning structure.
Figure 9:
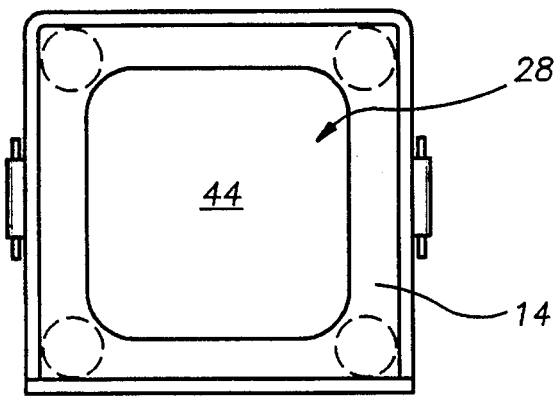
FIG. 9 is a further exemplary embodiment of the litter pan receiving member with another preferred positioning structure.

FIGS. 8 and 9 show two additional positioning structures which are particularly preferred. FIG. 8 shows a positioning structure 28 having a continuous positioning member 30 which forms a closed perimeter about a portion 34 of first bottom surface 32. FIG. 9 shows another positioning structure 28 formed by creating a recessed portion 44 in bottom member 14 into which the bottom of litter pan member 36 may be positioned.

It can be seen from the preceding description that a device for confining cat urine within a predetermined area which prevents cats from spraying urine on building walls and carpets, which cats will utilize, which is easy to clean, and lightweight has been provided.

It is noted that the embodiment of the cat litter pan enclosure described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A cat litter pan enclosure comprising:

a first litter pan member having a pan bottom, a first pan center and a first pan perimeter; and a litter pan receiving member having a bottom member and four side members, said bottom member having a first and second bottom surface, said first bottom surface having means on the surface thereof for facilitating positioning of said first pan center in registration with a central position of said first bottom surface, said four side members extending upwardly from said first bottom surface and being in connection with one another to form a closed bottomed container that is open above said first bottom surface, said first bottom surface being of dimensions sufficient to allow said pan center of said litter pan member to be placed thereon in registration with a central portion of said first bottom surface in a manner such that any portion of said pan perimeter adjacent to one of said side members is between two and five inches from said side member; one of said side members having a height of between four and eight inches above said first bottom surface, three of said side members having a height of between eight and thirty-six inches above said first bottom surface; said means for facilitating positioning of said first pan center in registration with a central portion of said first bottom surface including at least two registration members extending upwardly from said first bottom surface, said registration members being spaced a distance sufficient to at least partially receive therebetween said pan bottom; said first pan center being in registration with said central portion of said first bottom surface.

2. The cat litter pan enclosure of claim 1 further including:

a first handle member attached to one of said three side members having a height of between eight and thirty-six inches.

* * * * *